(12) United States Patent
Fitzsimons et al.

(10) Patent No.: US 12,116,972 B2
(45) Date of Patent: Oct. 15, 2024

(54) WAVE-POWERED TOWING APPARATUS

(71) Applicant: JOSPA LIMITED, Cork (IE)

(72) Inventors: Jocelyn Raymond Fitzsimons, Cork (IE); Patrick Joseph Duffy, Blackrock (IE); Cyril Kerr, Blackrock (IE)

(73) Assignee: JOSPA LIMITED, Cork (IE)

( * ) Notice: Subject to any disclaimer, the term of this patent is extended or adjusted under 35 U.S.C. 154(b) by 491 days.

(21) Appl. No.: 17/600,577

(22) PCT Filed: Mar. 20, 2020

(86) PCT No.: PCT/EP2020/057828
§ 371 (c)(1),
(2) Date: Sep. 30, 2021

(87) PCT Pub. No.: WO2020/200846
PCT Pub. Date: Oct. 8, 2020

(65) Prior Publication Data
US 2022/0178343 A1    Jun. 9, 2022

(30) Foreign Application Priority Data

Apr. 2, 2019 (EP) .................................... 19166737

(51) Int. Cl.
*F03B 13/18* (2006.01)
*B63B 21/56* (2006.01)
(Continued)

(52) U.S. Cl.
CPC ............ *F03B 13/181* (2013.01); *B63B 21/56* (2013.01); *B63B 35/32* (2013.01); *B63H 19/04* (2013.01); *F05B 2240/931* (2013.01)

(58) Field of Classification Search
CPC ......... B63B 21/56; B63B 21/62; B63B 21/66; B63B 35/32; B63B 19/02; B63B 19/04;
(Continued)

(56) References Cited

U.S. PATENT DOCUMENTS 3,453,981 A    7/1969   Gause
3,847,816 A *  11/1974  DiPerna ................ E02B 15/046
                                                          210/776
(Continued)

FOREIGN PATENT DOCUMENTS

BE       570 555 A     9/1958
JP     S63 149289 A    6/1988
(Continued)

OTHER PUBLICATIONS

International Search Report issued in PCT/EP2020/057828; mailed Jul. 29, 2020.

*Primary Examiner* — Daniel V Venne
(74) *Attorney, Agent, or Firm* — Studebaker & Brackett PC

(57) ABSTRACT

A towing apparatus has a spine with multiple generally parallel spine members extending in a longitudinal direction and having a length of at least 100 m, and with a leading end and a trailing end. A series of blades are mounted to the spine by couplers which allow the blade to rotate about an axis substantially transverse to the longitudinal direction, each blade having a first surface facing generally in the trailing end direction and a second surface facing generally in the leading end direction. Restraints prevent rotation of each blade by more than a pre-set amount towards the leading end, so that impingement of a wave on the first surface applies a force to the apparatus in the leading end direction. A pair of the towing apparatus' may be arranged to connect to a floating collector with a beach shape to collect floating debris on the sea surface, ridges helping to retain the debris on the slope until it is washed up into a channel.

17 Claims, 15 Drawing Sheets

(51) Int. Cl.
  *B63B 35/32* (2006.01)
  *B63H 19/04* (2006.01)
(58) Field of Classification Search
  CPC .... F03B 13/181; F03B 13/20; F05B 2240/93; F05B 2240/931; E02B 15/04; Y02T 70/5236
  USPC .................... 440/13; 114/242, 243, 249, 253
  See application file for complete search history.

(56) References Cited

U.S. PATENT DOCUMENTS

| | | | |
|---|---|---|---|
| 3,872,819 A | | 3/1975 | Pickens |
| 9,524,646 B2 * | | 12/2016 | Hine .................... F03B 13/1815 |
| 10,640,180 B2 * | | 5/2020 | Hine .................... B64C 39/024 |
| 2007/0173141 A1 | | 7/2007 | Hine et al. |

FOREIGN PATENT DOCUMENTS

| | | |
|---|---|---|
| JP | 4 192247 B2 | 12/2008 |
| KR | 2017 0110270 A | 10/2017 |
| WO | 94/10029 A1 | 5/1994 |
| WO | 98/39520 A1 | 9/1998 |
| WO | 2017025544 A1 | 2/2017 |

* cited by examiner

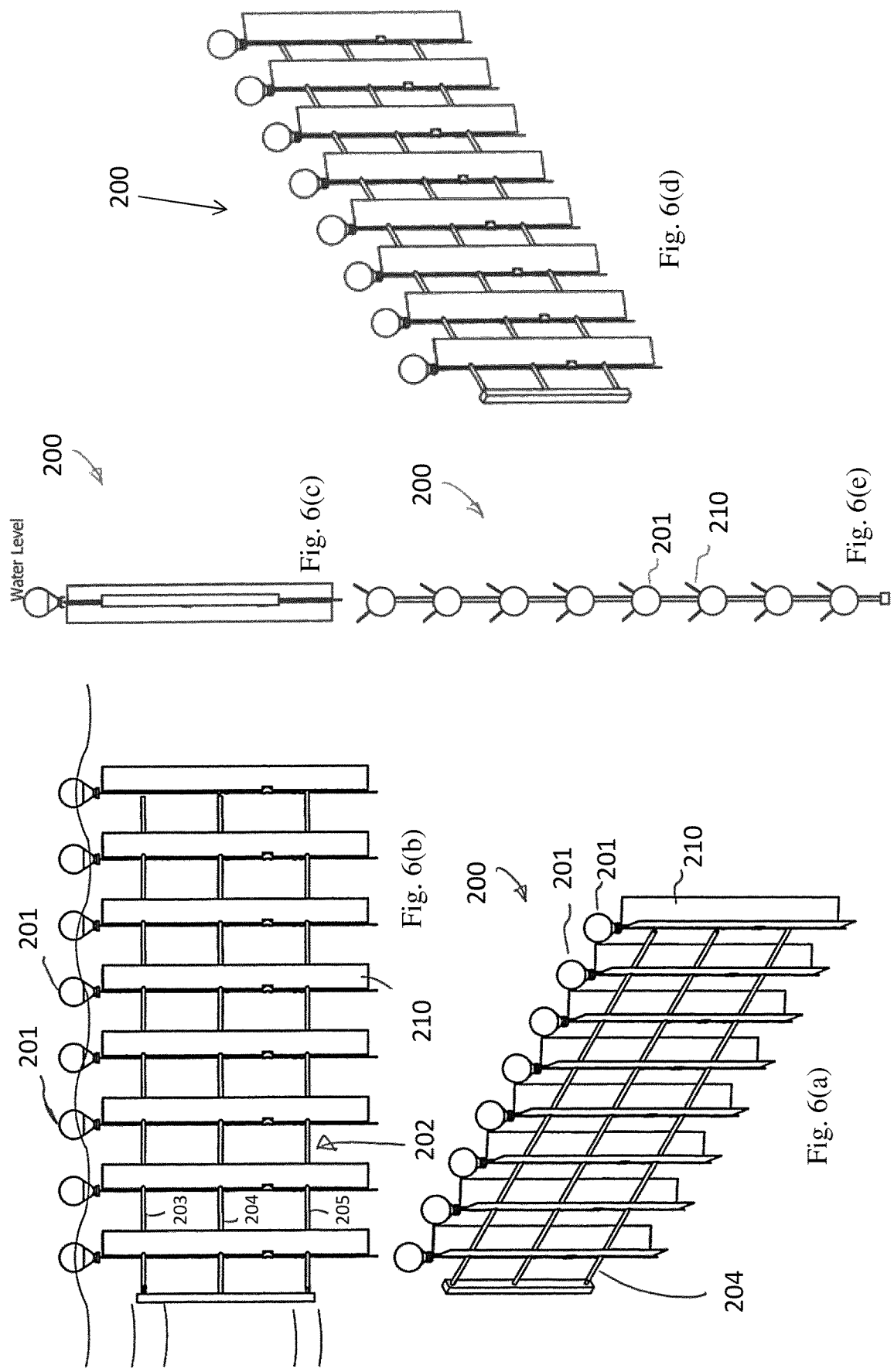

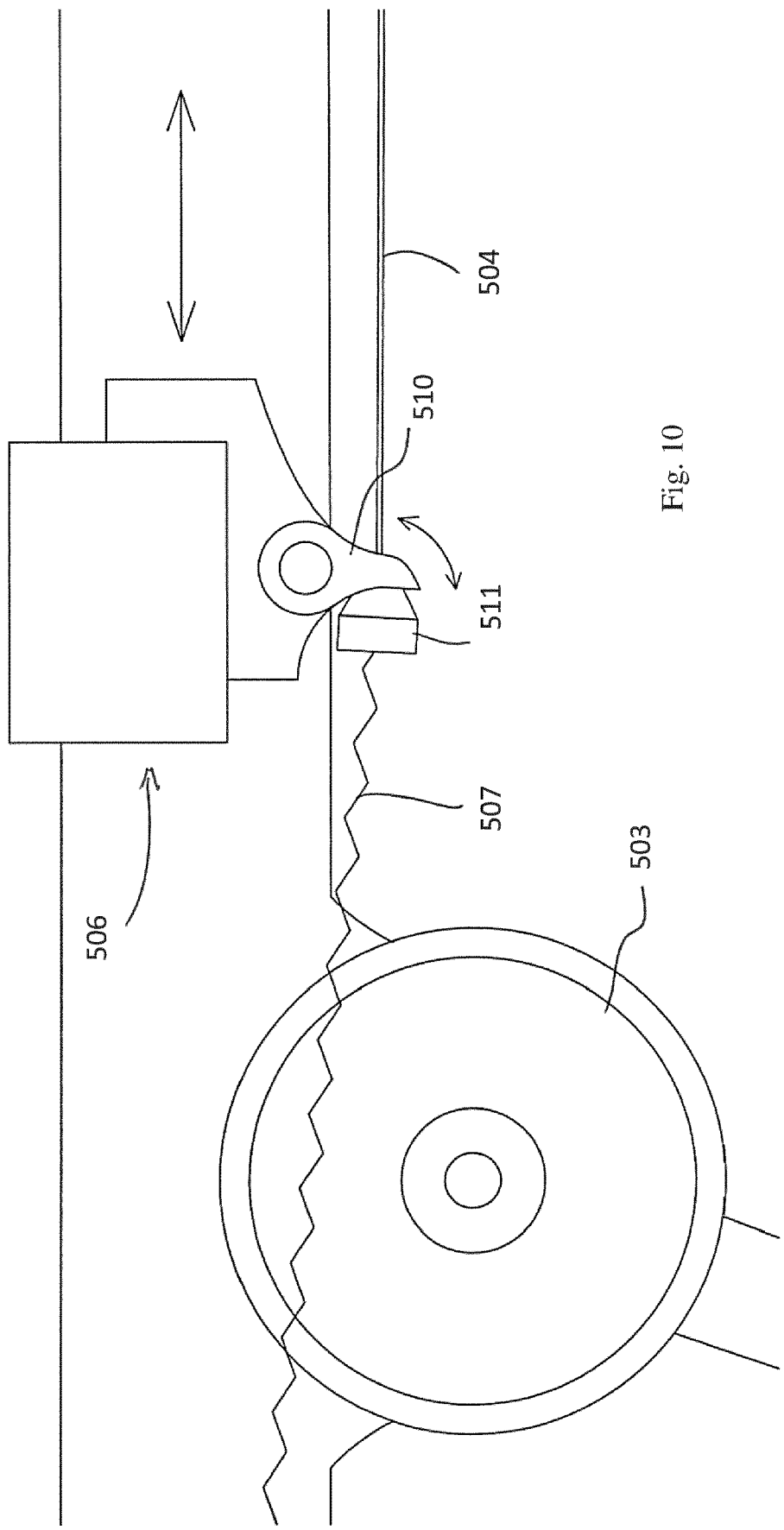

WAVE-POWERED TOWING APPARATUS

INTRODUCTION

The invention relates to a towing apparatus which is wave-driven.

Our prior PCT Patent Specification WO2017/025544 describes a towing apparatus having a long line of length greater than 100 m, blades pivotally mounted to the line, and restraints which prevent pivoting beyond a limit in one rotational direction and allow pivoting in the other.

The present invention is directed towards providing an improvement on such apparatus.

SUMMARY

A wave-powered towing apparatus is described in the accompanying claims directed to a towing apparatus, and a debris collection apparatus is described in the accompanying claims directed to a debris collecting apparatus.

We describe a towing apparatus comprising:
- a spine extending in a longitudinal direction and having a length of at least 100 m, and with a leading end and a trailing end;
- a series of blades each mounted to the spine to rotate about an axis substantially transverse to the longitudinal direction, each blade having a first surface facing generally in the trailing end direction and a second surface facing generally in the leading end direction; and
- restraints preventing rotation of each blade by more than a pre-set amount towards the leading end, so that impingement of a wave on the first surface applies a force to the apparatus in the leading end direction.

Preferably, the spine comprises at least one pair of parallel rails and the blades are each coupled to both rails. Preferably, there are at least three parallel rails, forming two pairs of rails each supporting a series of blades. Preferably, the two series of blades are offset in the longitudinal direction. Preferably, the extent of offset is approximately half of a gap between successive blades.

Preferably, the blades of the two series are overlapping in the transverse direction. Preferably, at least some of the blades are mounted to the spine by couplers which allow three-dimensional rotation.

Preferably, the spine comprises buoyancy at or near one edge. Preferably, the buoyancy comprises a series of floats or buoys.

Preferably, at least some of the blades each comprise a plate and a lip along the free edge extending towards the trailing end. Preferably, at least some of the blades are mounted for rotation about substantially horizontal axes and the length of the blades is in the range of 5 m to 40 m, and the depth of blades is in the range of 1.0 m to 2.0 m.

Preferably, at least some of the blades are mounted for rotation about substantially vertical axes and the dimension of the blades in the horizontal direction is in the range of 1.0 m to 2.0 m, and the depth of the blades is in the range of 10 m to 25 m.

Preferably, the gap between blades is in the range of 1.0 m to 3.0 m. Preferably, the length of the apparatus is in the range of 100 m to 1 km.

Preferably, the apparatus further comprises an actuator arranged to retract blades towards the spine or to remove constraints to render them disabled. Preferably, the actuator comprises a linear actuator to adjust restraint cables of the blades to allow them to pivot freely.

Preferably, the restraints of at least some blades comprise restraint cables, each extending from the spine to a blade at or near the blade free edge, whereby waves incident on the first surface apply force via the blade, to the blade couplers and restraint cables. Preferably, the restraints of at least some blades comprise a lock configured to engage a blade to prevent rotation.

Preferably, the lock comprises a pawl arranged to releasably engage teeth on the blade. Preferably, the pawl is both rotatable to engage the blade by rotation and is also movable translationally to engage the blade.

Preferably, at least some blades are integrally hinged to the support by a flexible hinge joint.

Preferably, the apparatus further comprises an actuator arranged to remove constraint force from at least some blades to render them disabled. Preferably, a restraint cable is linked to a coupler which is arranged to engage with and to disengage from an inner end of a restraint cable.

Preferably, the cable coupler comprises a latch mechanism, and the cable inner end is biased by a spring to a home engaged position.

The apparatus may further comprise wind vanes for capturing wind energy.

Preferably, the spine comprises at least one member which includes a polymer material. Preferably, the spine includes reinforcement metal, preferably wound in a spiral. Preferably, the spine comprises at least one member which includes a pocket for fluid such as air or water.

Preferably, the spine includes a fluid pocket and a means to pressurise a fluid in the pocket to adjust stiffness.

We also describe a collection apparatus for gathering floating debris from the sea surface, the apparatus comprising at least two towing apparatus linked to a gathering guide, so that the towing apparatus and the guide form a C-shape in plan, preferably narrowing to form a curved apex in plan formed by the guide.

Preferably, the guide comprises protrusions for trapping debris. Preferably, at least some of the protrusions are of increasing height in the trailing direction. Preferably, the protrusions include ridges. Preferably, the protrusions include strands of material anchored on the guide body.

Preferably, the guide comprises a debris-collection a channel at a trailing end of the guide. Preferably, the guide includes fluid pockets for buoyancy.

Preferably, the apparatus includes a controller adapted to pump fluid into buoyancy fluid containers such as pockets in the guide to control elevation. Preferably, the guide if of a flexible material and the apparatus includes a controller to pump fluid into the air pockets to control rigidity of the guide.

DETAILED DESCRIPTION OF THE INVENTION

The invention will be more clearly understood from the following description of some embodiments thereof, given by way of example only with reference to the accompanying drawings in which.

Figure 7A:
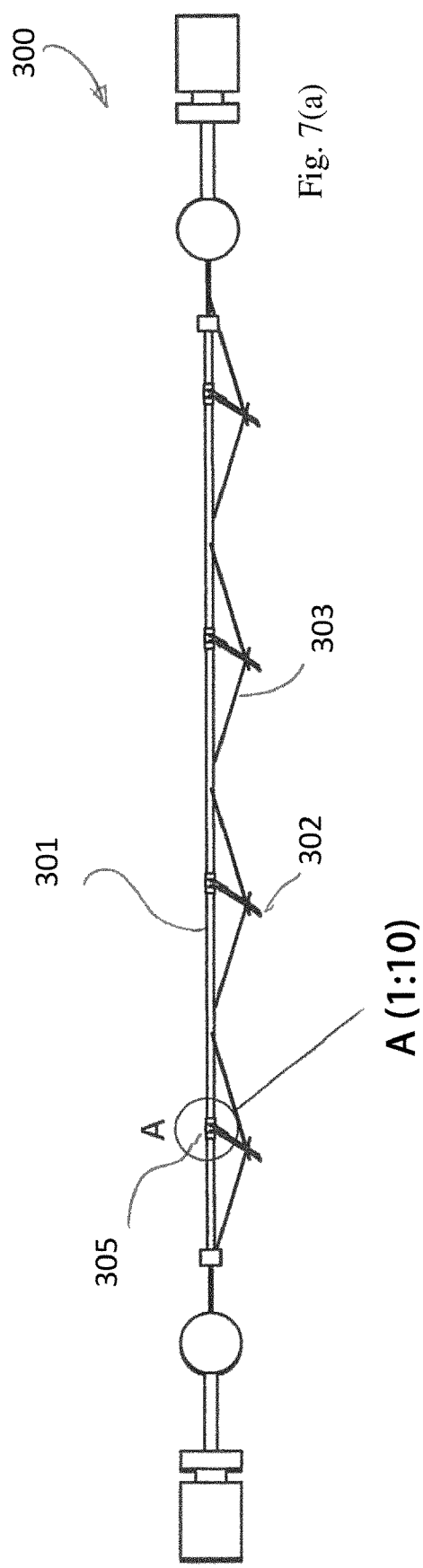
Figure 7B:
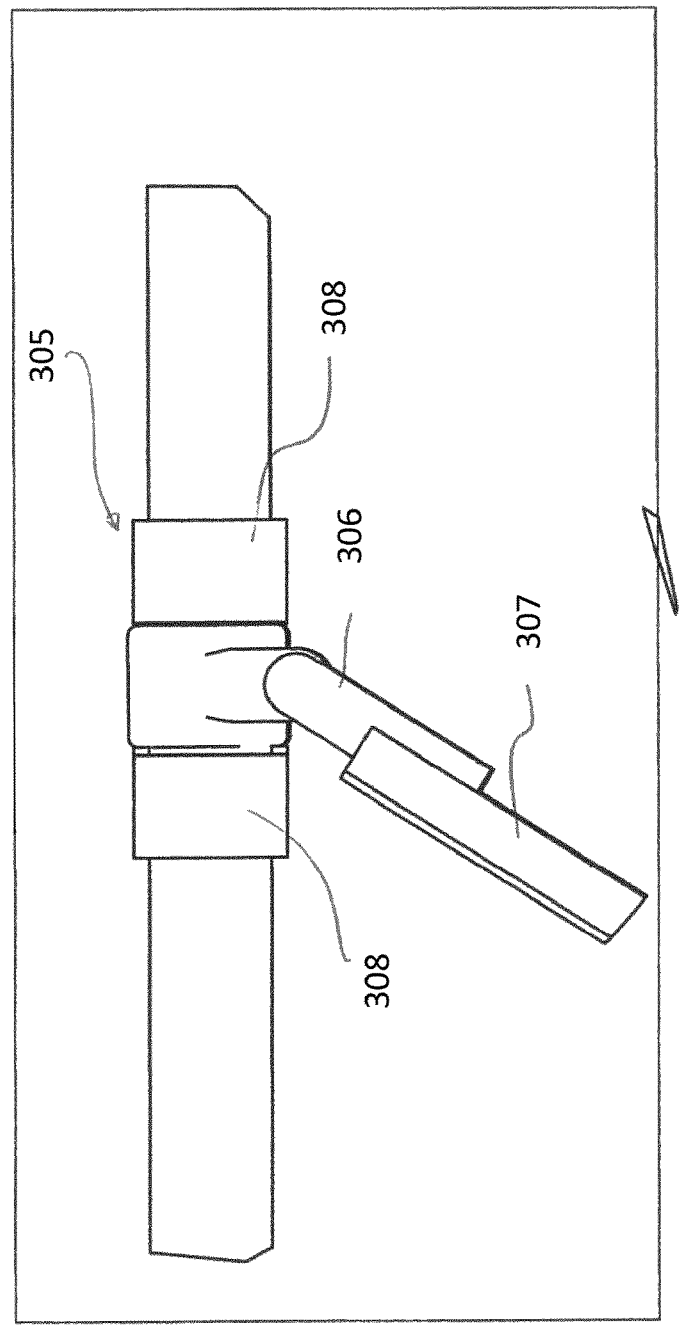
Figure 8:
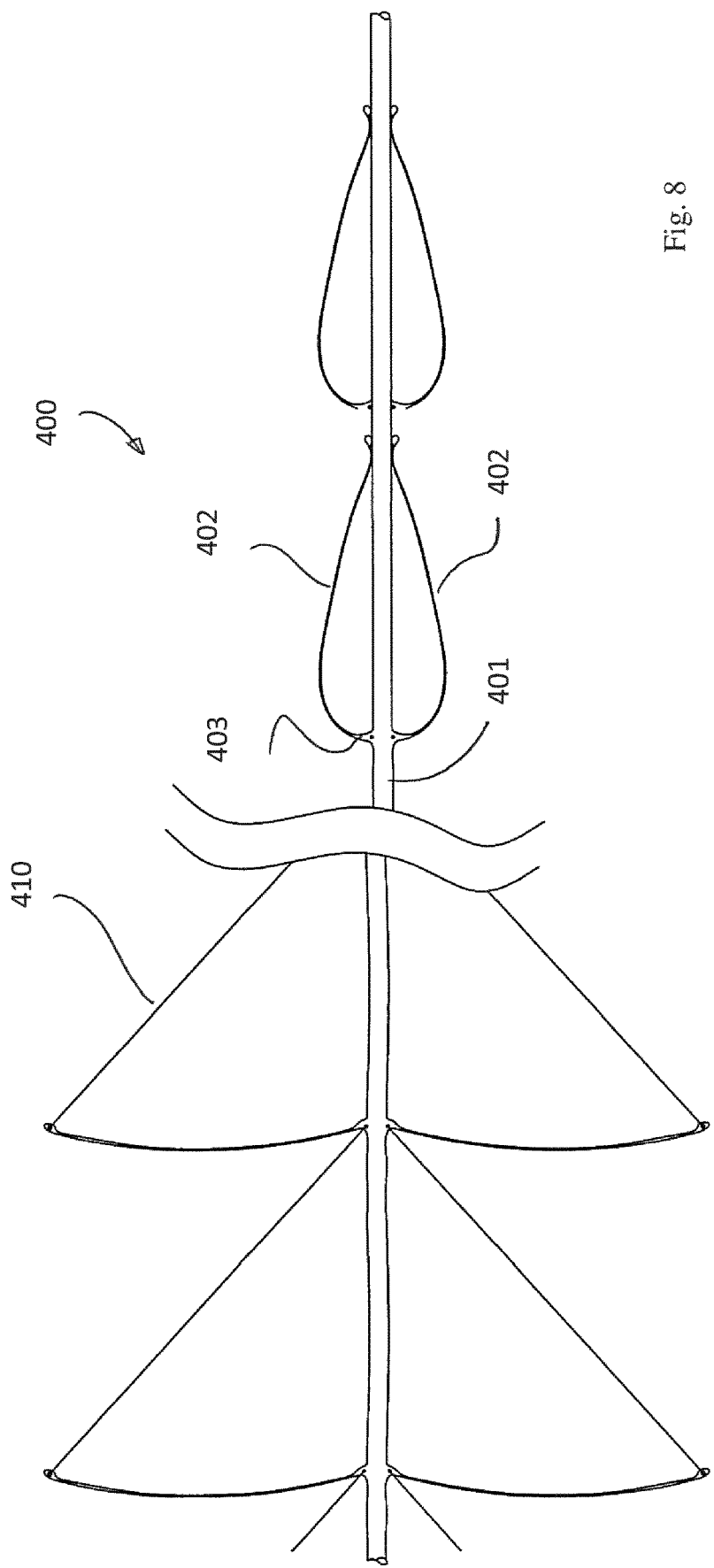
Figure 9:
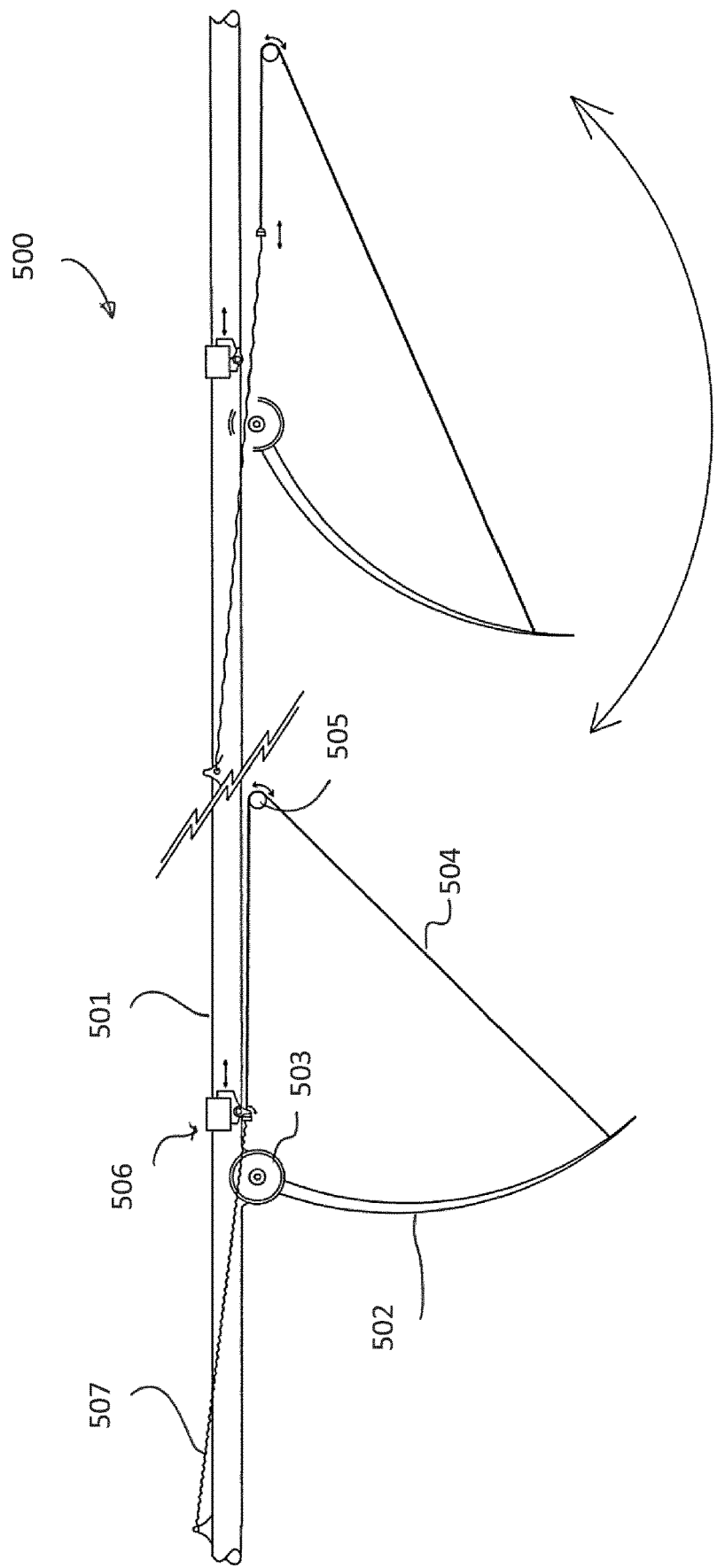
Figure 11A:
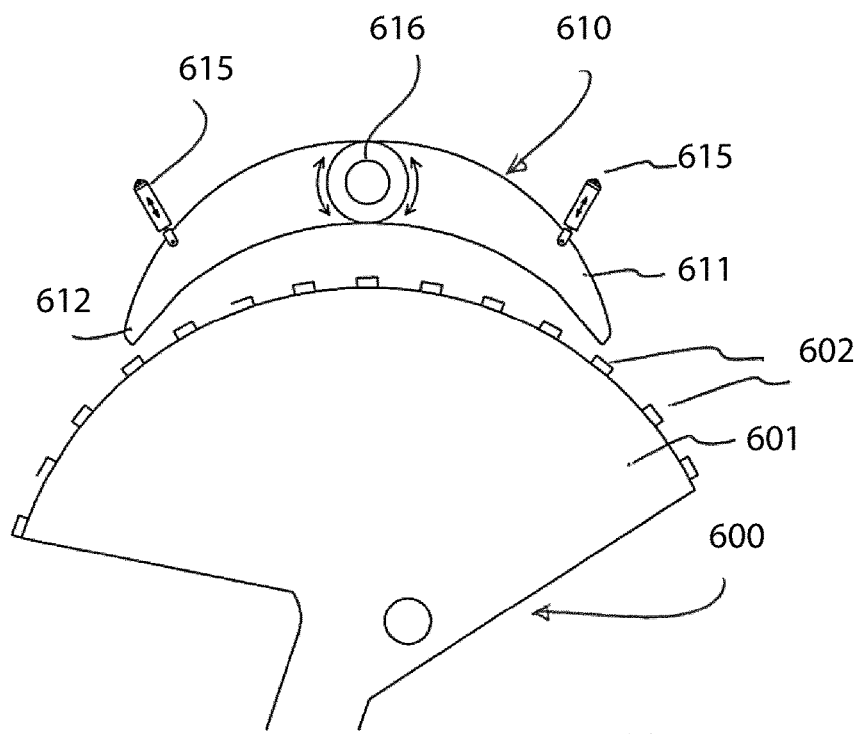
Figure 11B:
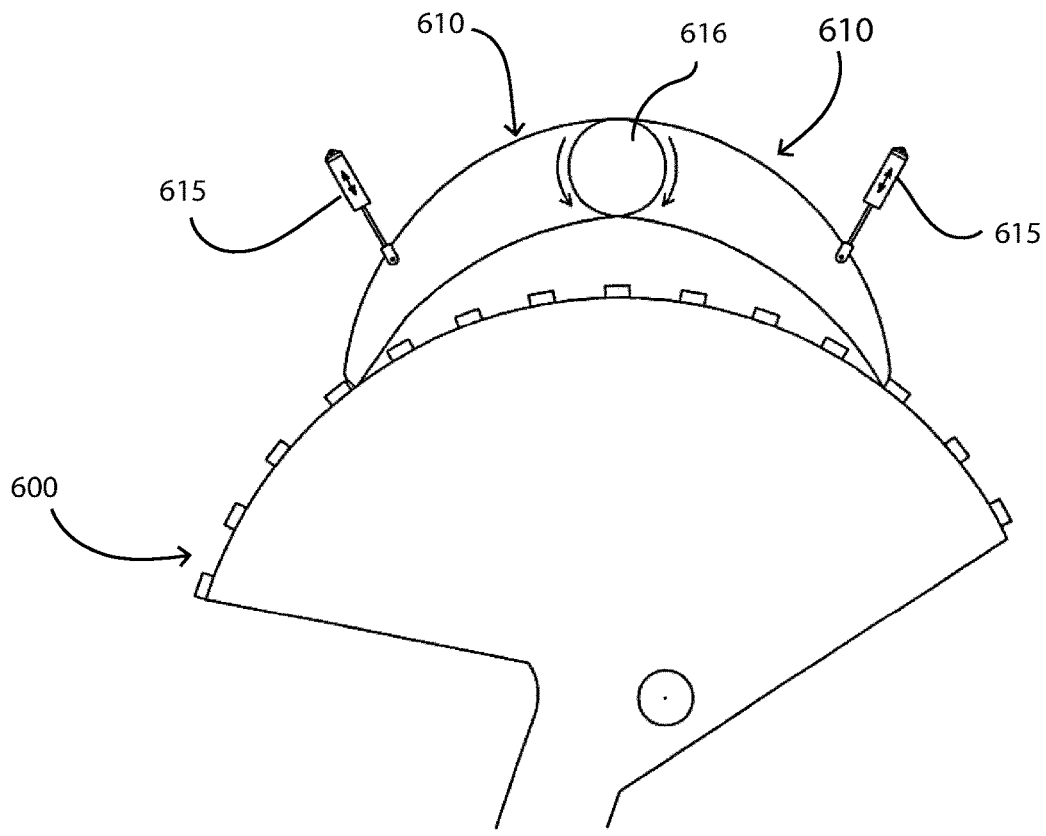
Figure 12:
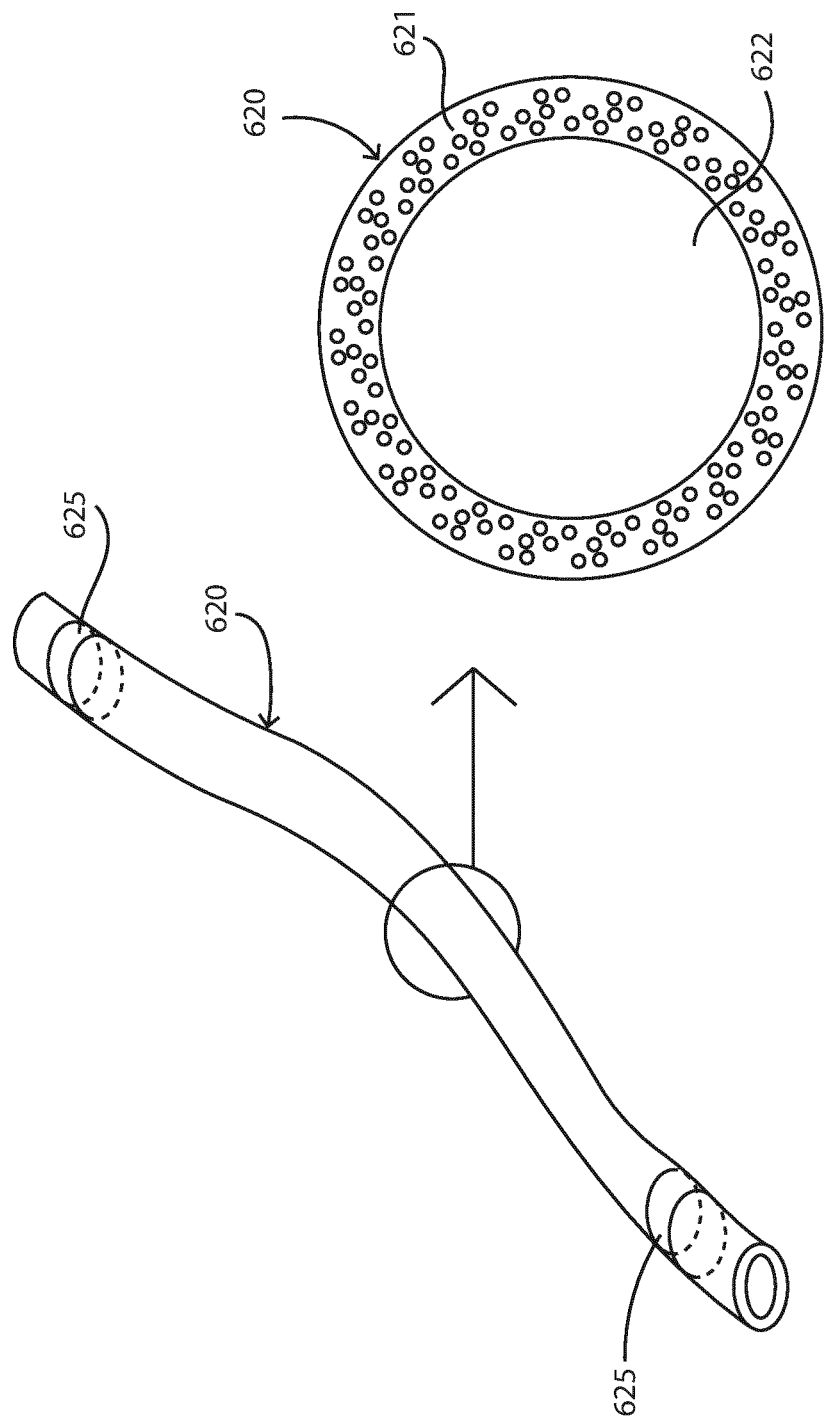
Figure 13:
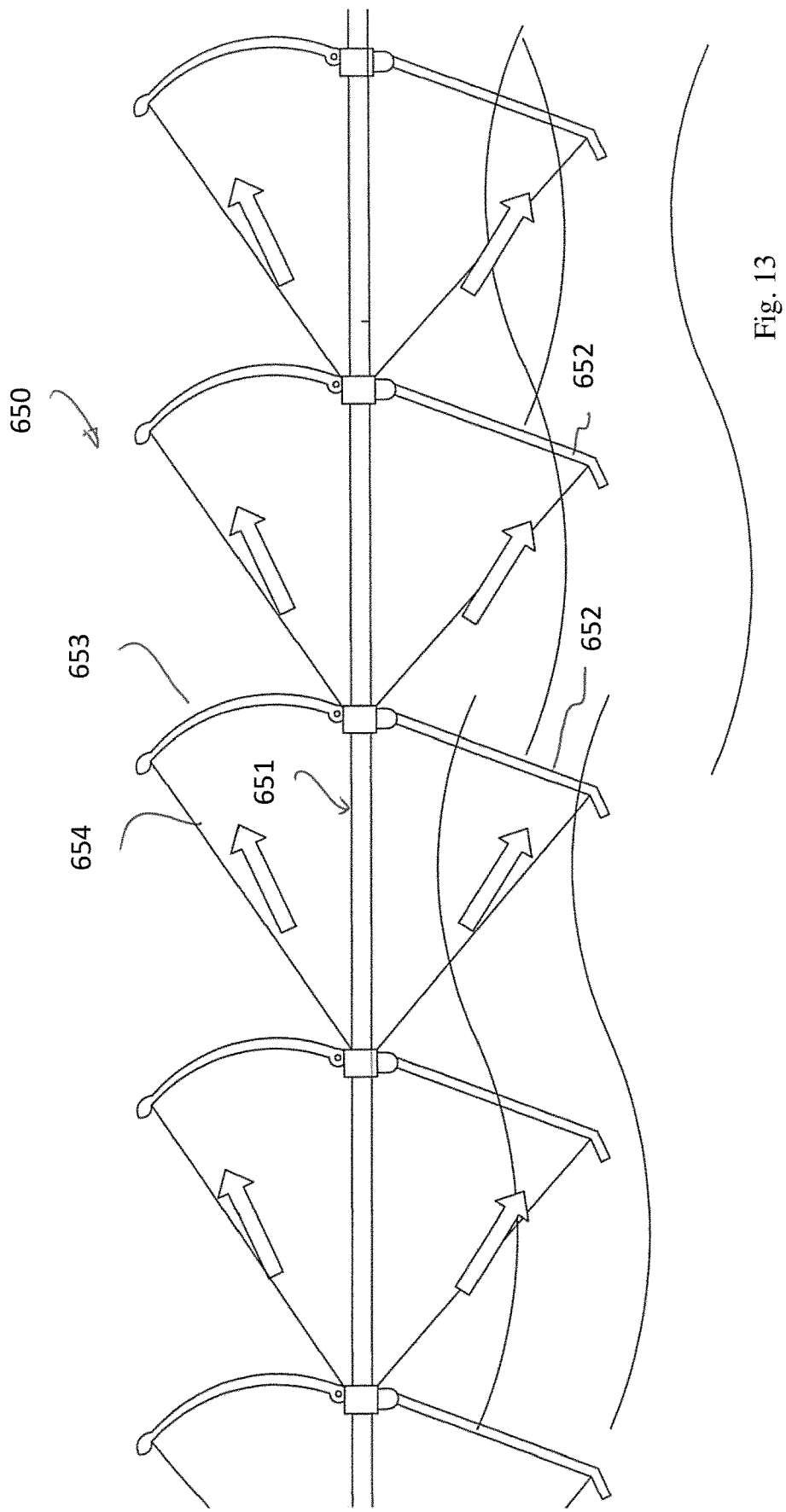
Figure 14:
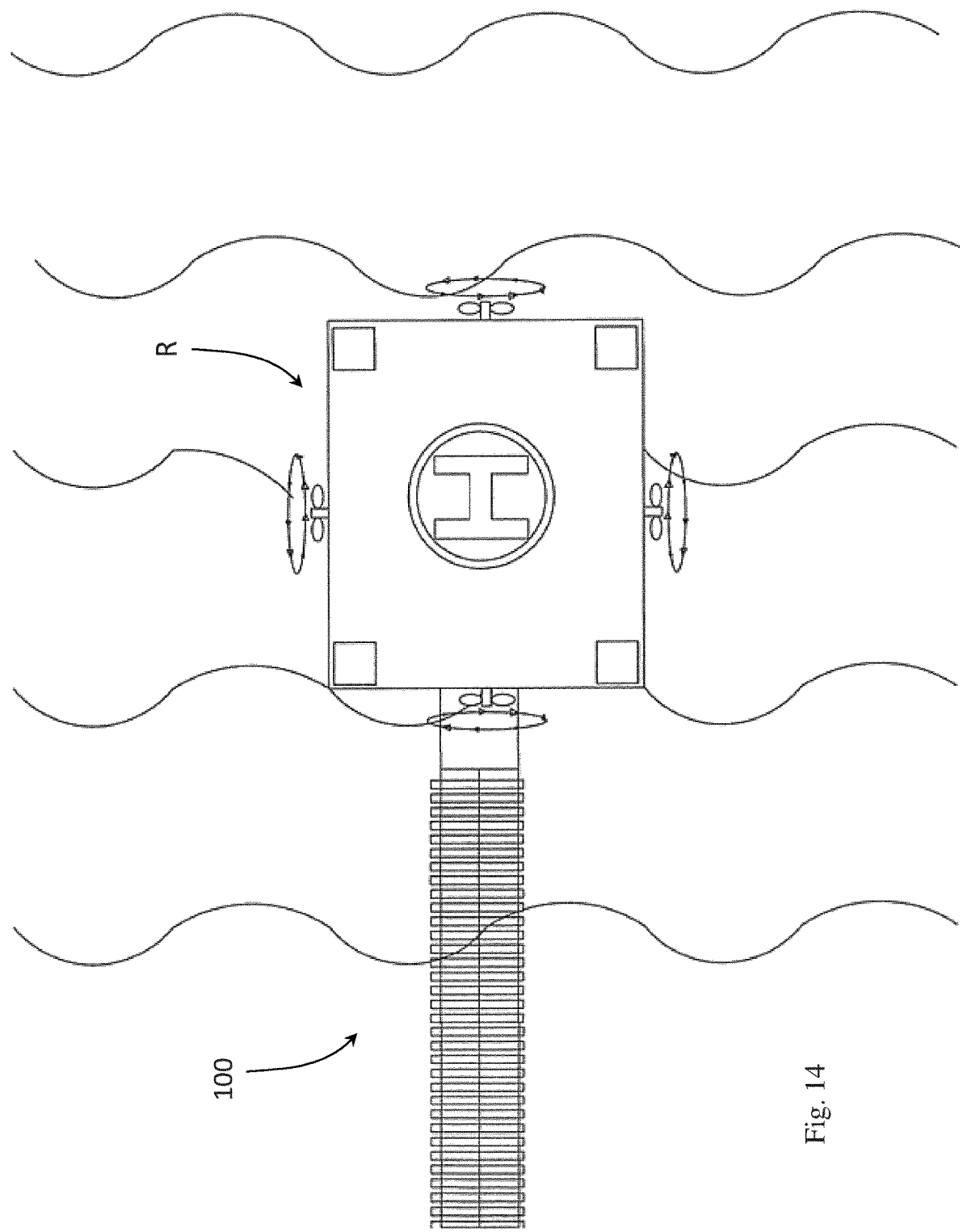
Figure 15:
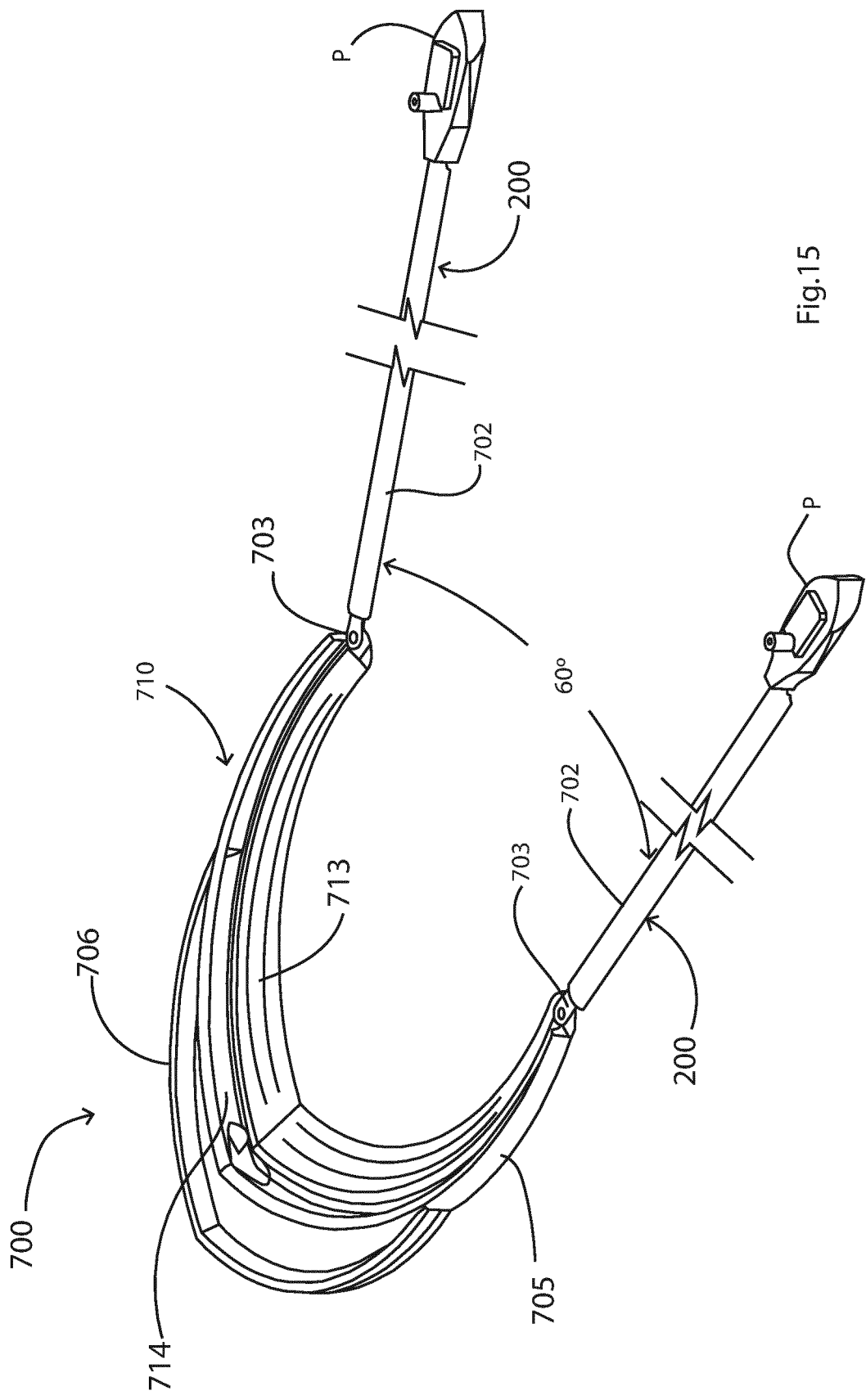
Figure 16:
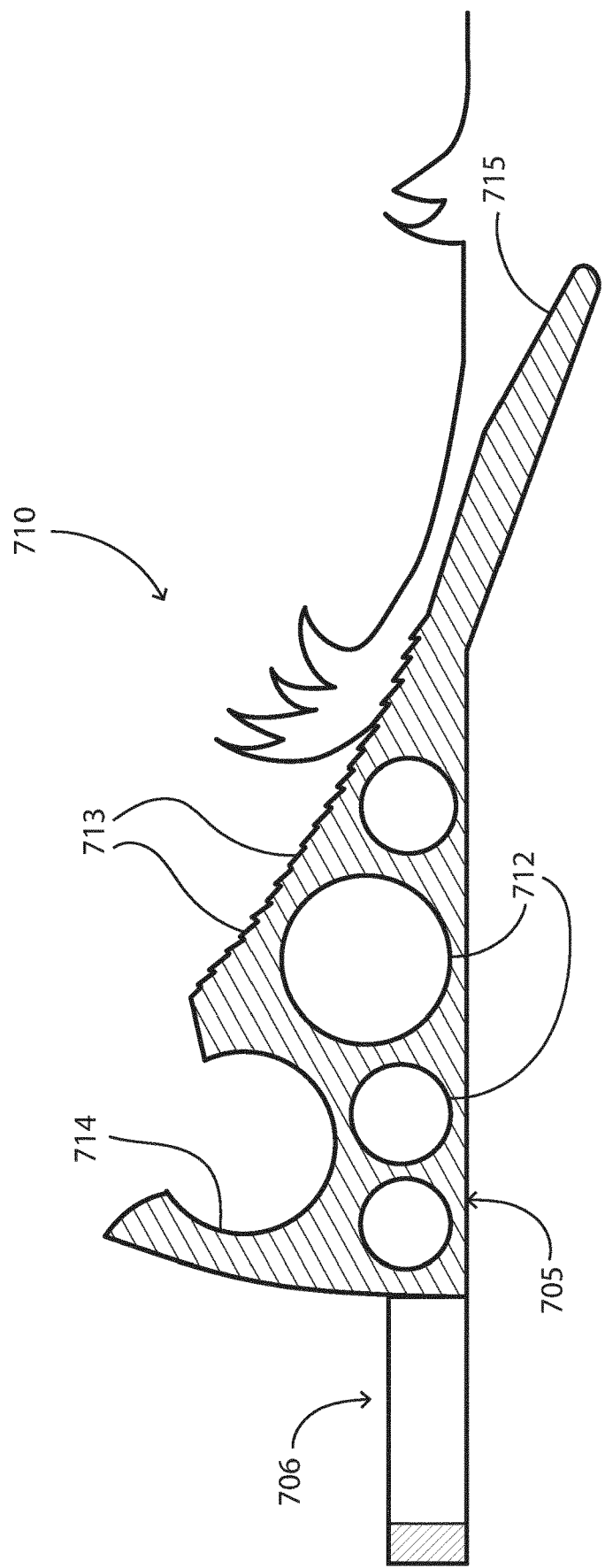
Figure 17:
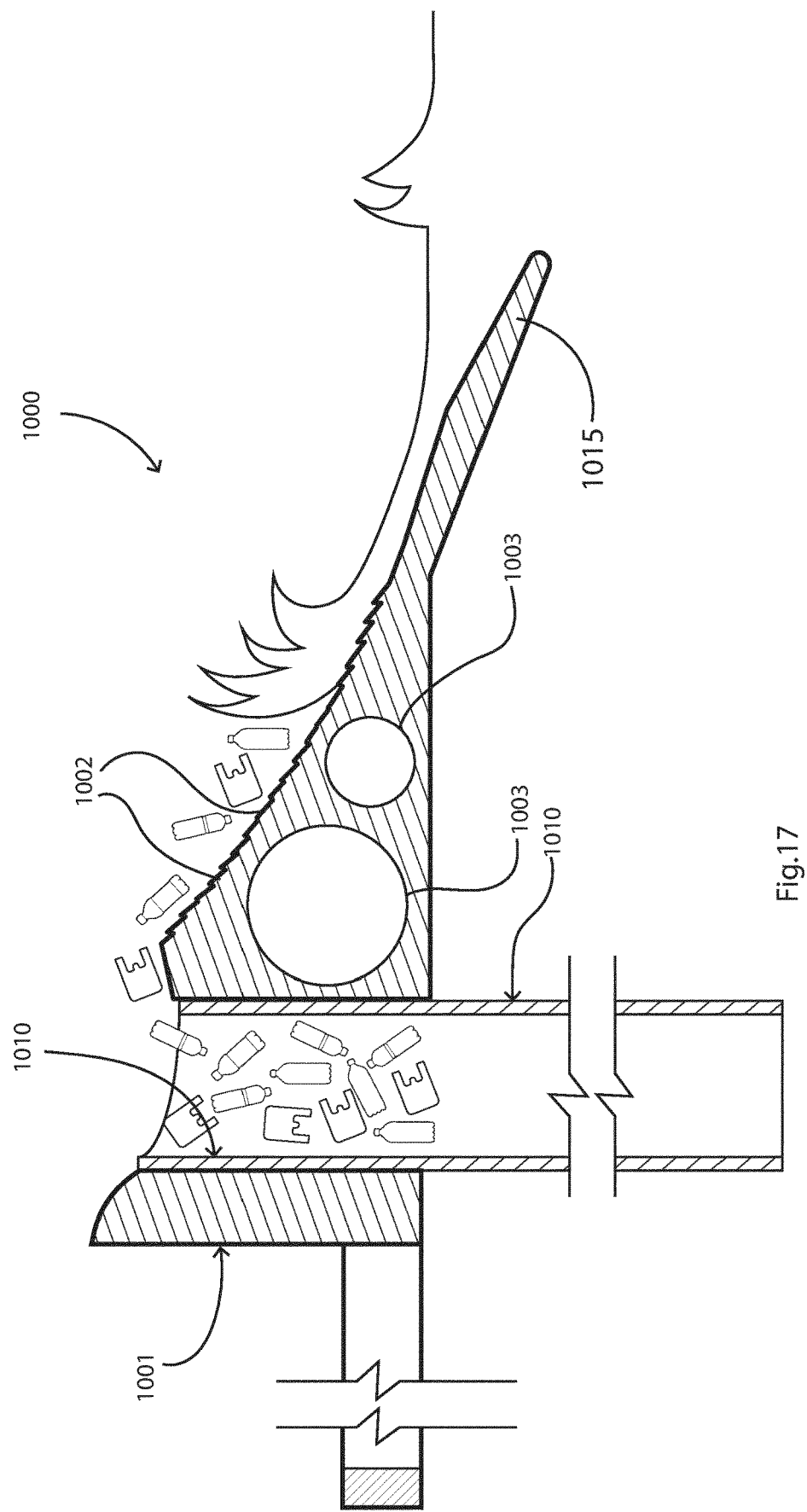

FIGS. 6(a) to 6(e) are top perspective, side, end, opposed top perspective, and plan views respectively of an alternative towing apparatus, in this case with a vertical blade axis;

FIG. 7(a) is a side view of an alternative apparatus, and FIG. 7(b) is an enlarged view of a coupler;

FIG. 8 is a plan view of part an alternative apparatus, in this case with blades which are integral with a support;

FIG. 9 is a side view of an alternative apparatus, in which the blades can be easily disengaged to cater for storm conditions, and FIG. 10 is an enlarged view showing in detail a latch for releasable engagement with a restraint cable;

FIGS. 11(a) and 11(b) are side views showing an alternative arrangement for retaining the blades at the energy-capturing position, in this case avoiding need for restraint cables, although restraint cables could additionally be provided;

FIG. 12 is a perspective view of part of a spine member of an apparatus, and a cross-sectional view through the spine member;

FIG. 13 is a diagrammatic side view of an alternative towing apparatus;

FIG. 14 is a plan view of an oil rig to which a towing apparatus is connected for passive stabilization of position of the rig in the horizontal plane;

FIG. 15 is a perspective view of a floating debris gathering apparatus for retrieving floating debris such as plastics items from the sea surface, and FIG. 16 is a cross-sectional view through a debris collector of the apparatus; and FIG. 17 is a cross-sectional through an alternative debris collector.

DESCRIPTION OF THE EMBODIMENTS

Horizontal Axis Blades

Figure 1:
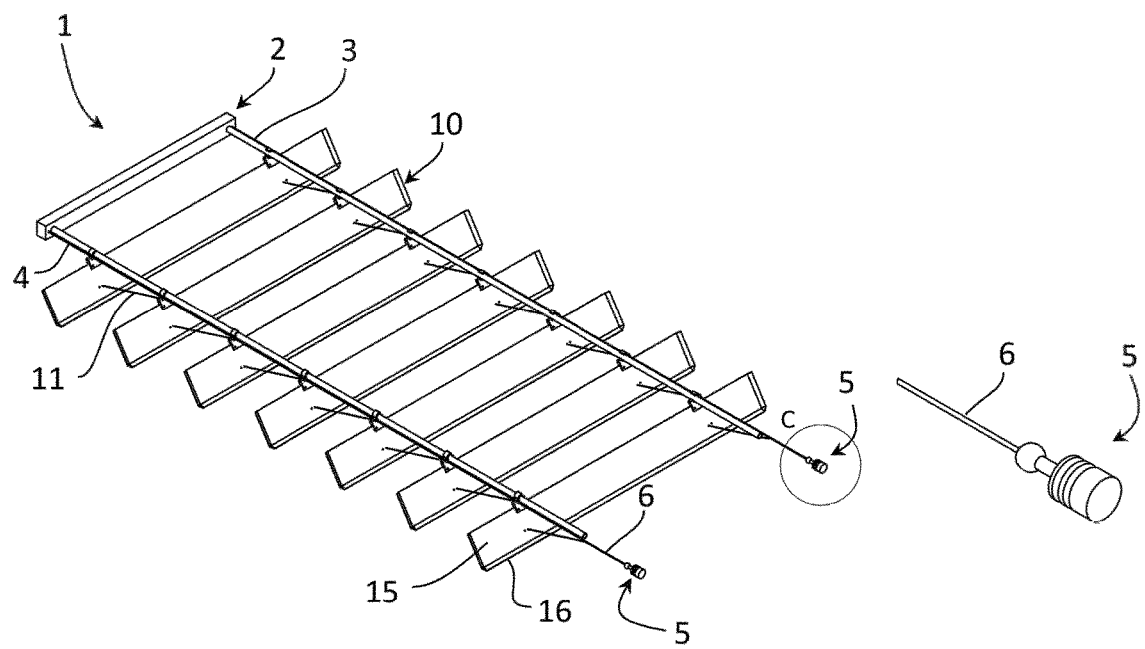
FIG. 1 is a perspective view of a towing apparatus of the invention.
Figure 2:
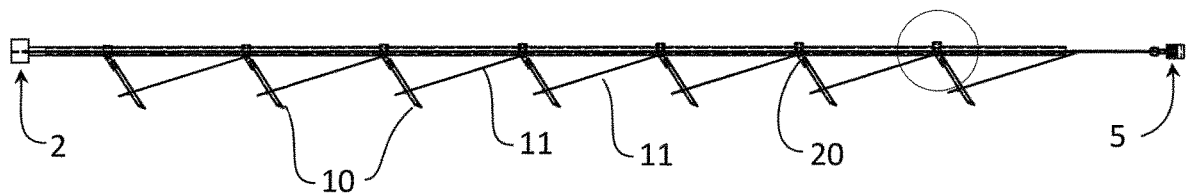
FIG. 2 is a side view of the apparatus.
Figure 3:
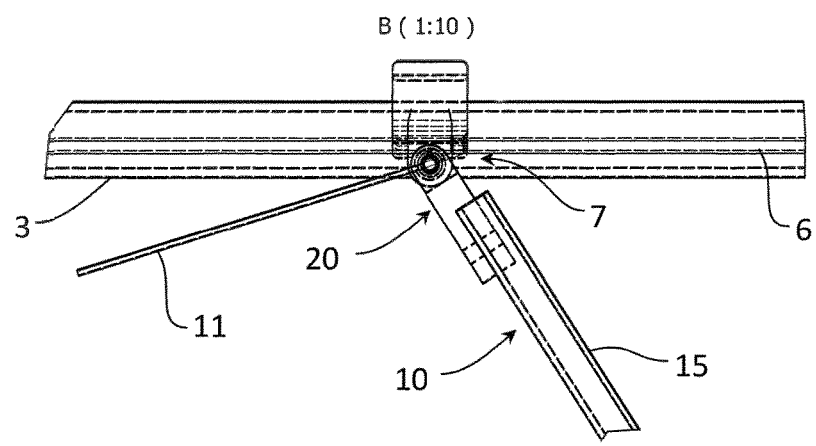
FIG. 3 is an enlarged side view of a coupler of the apparatus.

Referring to FIGS. 1 to 3, a towing apparatus 1 comprises an elongate spine 2 which is rectangular in plan, with a transverse structural member 2 across its leading end and a pair of parallel elongate spine members or rails 3 and 4 extending in the longitudinal direction. What is shown here is just a section of the full length, covering a portion of a wavelength. There are additional transverse structural members, not shown, along the length of the elongate spine members. The spine 2 extends in a longitudinal direction from a leading end on the left as viewed in FIGS. 1 and 2 to a trailing end on the right.

At the trailing end there is an hydraulic linear actuator 5 mounted to each spine member 3 and 4, from each of which extends a control cable 6 which runs along the length of the respective spine member. There is a series of blades 10 pivotally mounted to the spine 2 across the spine members 3 and 4 and each extending downwardly from them for rotation about a horizontal axis. Each blade 10 comprises a rectangular plate 15 and a lip extending in the trailing direction from the plate's lower edge. There is a restraint cable 11 extending from a spine member to each blade, two per blade.

Figure 4A:
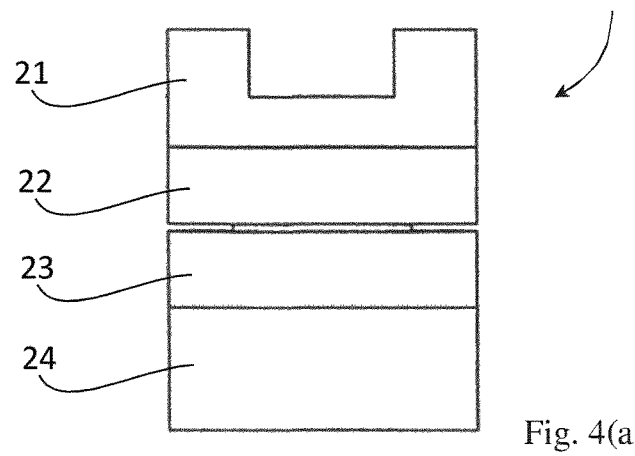
FIG. 4(*a*) is an end view of a blade coupler, FIG. 4(*b*) is a side view of the coupler, and FIG. 4(*c*) is a perspective view of the coupler.
Figure 4B:
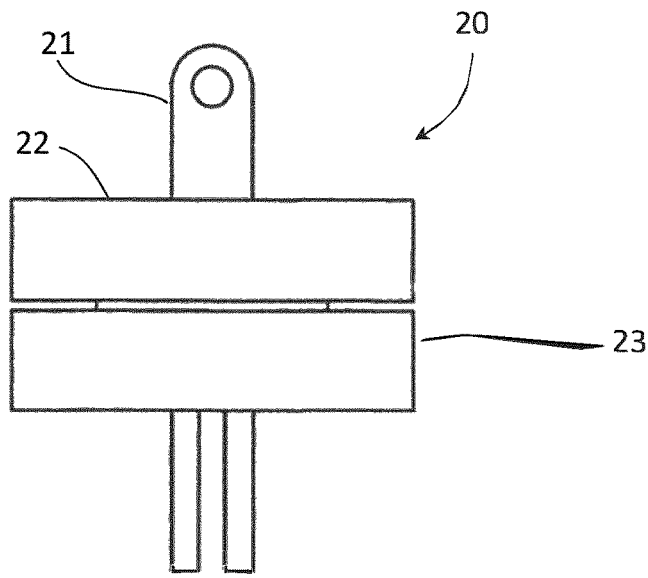
Figure 4C:
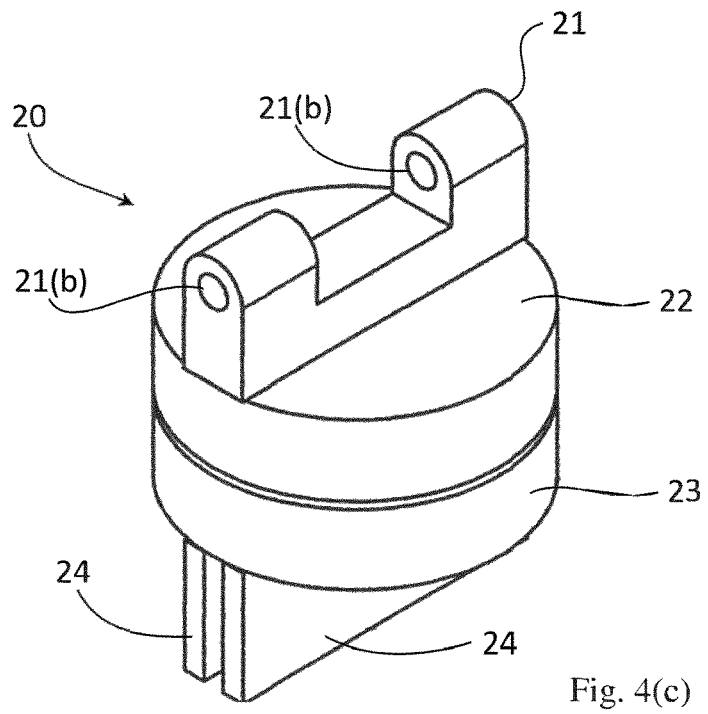

Referring particularly to FIG. 3, there is a coupler 20 connecting each blade 10 to each spine member 3. Each coupler 20 also supports a restraint cable 11 for the next most distal blade 10. Referring to FIGS. 4(a) to 4(c) each coupler 20 comprises a bracket 21 with a pair of flanges 21(a) for fitting on opposed sides of a spine member so that a pin (not shown) can extend through holes 21(b) in the flanges for engaging with the spine member. A main body 22 is fixed to the bracket 21. A rotatable body 23 is pivotally mounted to the main body 22 at a vertical axis joint. A pair of flanges 24 extends downwardly from the body 23 for engaging a blade plate 15.

In this case, the preferred dimension ranges for the horizontal-axis blades of the apparatus are:
length of blades 5 m to 40 m,
depth of blades 1.0 m to 2.0 m,
gap between blades in each series 1.0 m to 3.0 m, and
overall length of apparatus 100 m to 1 km.

The coupler 20 allows rotation about a horizontal transverse axis through the spine member and also rotation about a vertical axis through the body 23. It is therefore "universal", allowing limited three-dimensional rotation, especially of the blade 10 about a transverse horizontal axis across the rails 3 and 4 for capturing wave energy and also allowing a small degree of vertical axis rotation to accommodate some blade and spine bending.

Also, the restraint cable runs through a small hole in the coupler mount and is crimped on the other end, similar to how it attached to the fins (blades).

In use, the trailing end (right hand side of FIG. 1) of the spine 2 is linked to a vessel to be tugged, and a pilot vessel is linked to the leading end to maintain the apparatus 1 in a desired travel direction which must be within 45° of normal to the wave direction, while towing (more when turning).

Advantageously, the waves only apply force to the blades in direction from right to left of FIG. 1, but impingement on the leading-end surfaces of the blades 10 merely causes them to close over towards the spine.

It will be appreciated that the spine 2 provides excellent structural integrity to support the blades in a manner which allows them apply forward-moving force to the spine, but nevertheless the spine preferably has a degree of flexibility. The spine may be of any desired material with buoyancy due to the density of the material and/or due to internal air pockets.

The linear actuator 5 allows the restraint cables 11 to be loosened if desired, such as during storm conditions in which it is desirable that they are free to move, in a manner analogous to seaweed on rocks moving under wave action.

Figure 5A:
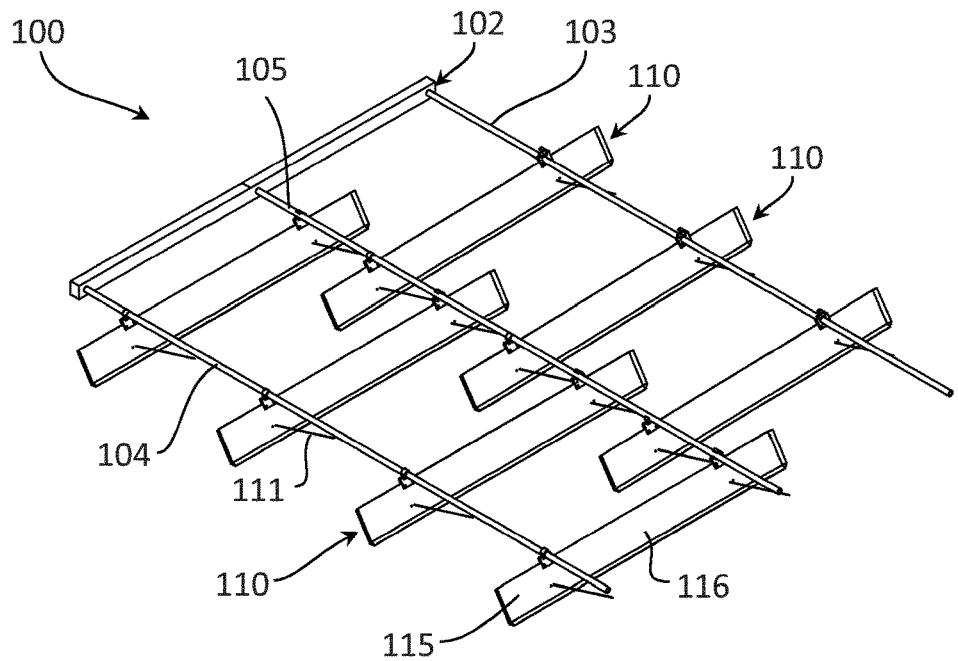
FIG. 5(a) is a perspective view of an alternative towing apparatus in this case with a horizontal staggered blade arrangement.
Figure 5B:
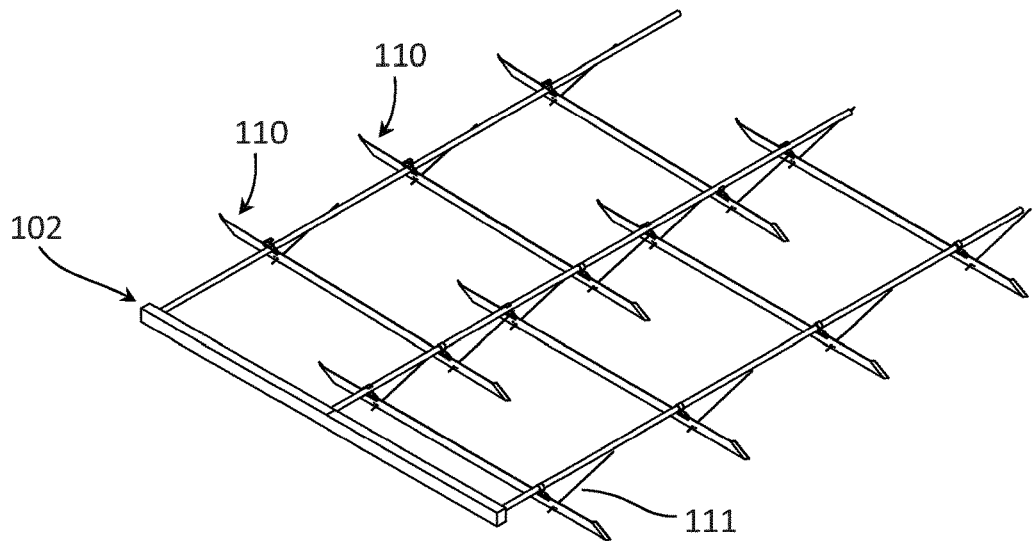
FIG. 5(b) is a perspective view from above of the leading end.
Figure 5C:
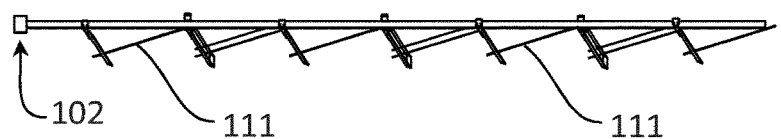
FIG. 5(c) is a side view.

Referring to FIG. 5 an alternative apparatus, 100, has a spine 102 with three horizontally-arranged parallel spine members, side spine members 103 and 104 and a central spine member 105. The three spine members form two pairs of spine members across each of which there is series of blades 110. The blades 110 are arranged in a staggered manner with each series being offset from the other by a distance of about half of the gap between successive blades. Also, the series are overlapping in the transverse direction.

In this case, the preferred dimension ranges are:
length of blades 5 m to 25 m,
depth of blades 1.0 m to 2.0 m,
gap between blades in each series 1.0 m to 3.0 m, and
overall length of apparatus 100 m-1 km With such a staggered arrangement there is less mass per unit of power.

Vertical Axis Blades

Referring to FIG. 6 a further apparatus, 200, has a spine 202 which is vertically arranged with three parallel spine members 203, 204 and 205 in the depth direction downward. The buoys 201 support the assembly at water level, shown as an undulating line through the buoys 201. A series of blades 210 are vertically mounted for pivoting about vertical axes to an extent restrained by ties (not shown) linking the blades to the spine. In this case, the dimensions are:

horizontal length of blades 1.0 m to 2.0 m,
depth of blades 10 m to 25 m,
gap between blades in each series 1.0 m to 3.0 m, and
overall length of apparatus 100 m to 1 km In this case because the blades need to remain vertical the buoyancy is primarily provided by the buoys 201. The extent of buoyancy provided by the buoys 201 is chosen to maintain the apparatus vertical, but the blades themselves may have internal air pockets biased towards their tip ends to assist overall buoyancy without introducing instability.

A benefit of vertical axis blades is that they occupy less "footprint" on the ocean surface. This is of particular benefit for some applications, such as a debris collection application described below.

Alternative Restraints, Couplers, and Blades

Various restraints and couplers are described for pivotal attachment of blades to the spine. While they are illustrated for horizontal-axis blades, they may be used alternatively for vertical-axis blades.

FIG. 7 shows an apparatus 300 with an elongate spine 301, blades 302 pivoting about horizontal axes, restraint cables 303, and couplers 305 connecting the blade to the support. The couplers 305 each comprise a connector with a top portion 306 and a blade-engaging part 307. The couplers 305 can be unclipped for convenient assembly and disassembly. The couplers 305 are prevented from sliding by large mouldings 308 either side.

FIG. 8 shows an apparatus 400 in which a spine supports blades 402 which are both flexible and have an integral pivot joint 403 to the spine. The blades 402 and the pivot joints 403 are integral with tubes 401 around a structural part of the spine. The rubber or thermoplastic elastomer fins 402 may have a stiffener at the 'away' end to the spine and perpendicular to the spine. Also, there may be stiffener battens, like on sails.

FIG. 9 shows an alternative apparatus, 500, having an elongate spine 501 and blades 502 pivoting about pivot joints 503 mounted to the spine 501. Each blade 502 is restrained by a restraint 504 which extends rearwardly and is trained around a pulley 505 and forwardly to an end where it is connected to a spring 507. The restraint is retained by a latch 506 which is releasable under control either mechanically or electrically to engage and disengage the restraint 504. When disengaged, the blade 502 is free to pivot, which is suitable for storm conditions. The spring 507 keeps the end of the restraint in position for re-engagement by the latch 506.

The latch 506 is shown in more detail in FIG. 10, in which a forked catch 510 engages an end stop 511 on the restraint when the catch projects outwardly (downwardly in this view). It is very advantageous that there is the storm damage avoidance by 'release and re-catch' using the wave motion itself to provide the actions required for release and re-constraint of the blades.

For storm protection, in the event of excessive storm forces, the blades may be quickly released and reset. The tug apparatus may have sensors connected to a controller to detect excessive ambient forces, for example strain gauges on the spine. These sensors trigger the controller to release some or all of the blades, allowing them to feather freely, like seaweed, with the flow of the wave. After a time, the blades are reset and put back to work in an ordered sequence. The power to do this is provided by the blades being powered fore and aft by the waves. Thus, little force is required, shown as a light elastic restraint in FIGS. 9 and 10.

The mechanical latches shown in this drawing are flipped down to engage an anchor on the main power cable and the blade is returned to the working mode. During storm protection mode the small tension pilot tug/tugs continue to maintain approximate linearity of the entire tug spines, thereby preventing twisting.

An additional feature may be added to this catch feature to optimize the blade power angle to suit wave conditions. Hydraulic or other force can move the catch forward or back a short distance, from time to time to suit general sea state.

Referring to FIGS. 11(a) and (b) a blade 600 of another apparatus is restrained by a lock adjacent the pivot joint. The blade has a hub 601 with radial teeth 602 which are engaged by pawls 611 and 612 of a pawl device 610. The pawl device 610 is operated to move translationally or to rotate about a pivot joint 616 by linear drives 615. This arrangement can be an additional restraint or a sole restraint which avoids need for restraint cables. The relative locations of the pawls and the pivot axis are chosen to achieve the desired restraint force, the greater the separation the greater the restraint for a given force applied by the pawl device 610. FIG. 11(a) shows the position in storm protection mode, so the blade is free to swing and move, similar to seaweed, whereas FIG. 11(b) shows the position for energy capture.

Spine Members

As mentioned above it is preferable that the spine has a degree of flexibility, sufficient to allow it to bend in compliance with the wave surface. FIG. 12 shows one arrangement, in which a spine has at least one member 620 which has a hollow tube 621 of a reinforced plastics material enclosing a volume 622 for holding air under pressure. An example of the tube material is thermoplastic elastic or rubber tyre type material, with steel wire reinforcing yarn with long pitch rotating spirals. This is analogous to a garden hose, but the dimensions are much greater. For example, the spine member has preferably a diameter in the range of 200 mm to 400 mm, and where hollow the wall thickness is preferably in the range of 10 mm to 50 mm. The internal space provides additional buoyancy, and it may be pressurised to achieve additional stiffness. The material of the spine member may include steel wire reinforcement, and such reinforcement may have long pitch counter-rotating spirals. The bulk material of the spine may be any suitable thermoplastic elastics or rubber material which is suited to ocean conditions.

Some of the reinforcing material may diverge out from the spine member to attach to a blade or a blade support such as a flange to prevent the blade from moving longitudinally in the spine direction. This reinforcing wire would be surrounded by a sheath.

In general, the spine preferably has sufficient flexibility to track the ocean's undulating surface without lifting the blades out of the water. Such flexibility is preferable, but there should be sufficient rigidity to prevent distortion at load points of blades and cables for example.

FIG. 13 shows an apparatus 650 having a spine 651 with blades 652 below, and above water there are vanes 653 for capturing wind energy for additional motive power. The vanes 653 are restrained by cables 654.

FIG. 14 shows an oil rig R with a towing apparatus 100 (as shown in FIG. 1) linked to one side. This helps to positionally stabilize the rig on the horizontal plane, and reduces positioning energy.

There may be solar panels above the spine, and solar power may be used for the pilot vessels and/or for system control and satellite communications.

Buoyancy can be achieved by hollow spine members and/or by hollow blades. Where there are wind energy converters such as sails as shown in FIG. 13, Helium enclosures may be provided to lift left the sails, preventing them from being immersed in water.

The pressurised tubes would fill much of the space, thereby reducing material requirement and providing rigidity when pressurised with a fluid (water lower down and air higher up). The spine flexibility achieves damage limitation by trunks of trees or shipping containers due to flexibility, and stability in sea motion. The fluid pumped into the tube may be changed according to the conditions or time of year. For example, water may be pumped in to reduce buoyancy and increase weight and to be positioned lower relative to the sea surface. There may be wire radial reinforcement around the periphery of the spine tubes as is typical on hoses and tyres.

In other embodiments, there may be a catch to engage a restraint cable to optimize the blade power angle to suit wave conditions. Hydraulic or other force can move the catch forward or back a short distance, from time to time to suit general sea state. During storm protection mode the small tension pilot tug/tugs continue to maintain approximate linearity of the entire tug spines. Buoyancy can be achieved by air pockets in the spines. But the blades may additionally or alternatively have air pockets to achieve the necessary buoyancy.

Debris Collecting Apparatus

Referring to FIGS. 15 and 16 a debris collecting apparatus 700 is for collecting plastics, and/or weeds, and/or surface oil. The apparatus 700 comprises two towing apparatus' 200 as illustrated in FIG. 6 each linked at the rear end to a guide or debris collector 710 at an apex between the towing apparatus' 200. Each towing apparatus 200 is of the type having vertical axis blades as shown in FIG. 6, and is shown diagrammatically. The towing apparatus' may, however, be of any of the above-described types, and indeed it could be of a conventional tug linked by towing cables instead of a towing apparatus of the invention.

Where the towing apparatus is of the vertical axis type the blades and spine are particularly suited to perform the dual functions of providing motive power under wave impingement and also as guides to direct relative movement of debris such as plastics debris towards the apex collector 710. As show in FIG. 15 the collector 710 forms an apex with legs extending at about 60° from a central apex location forming a debris-collecting mouth, and this is the preferred mutual angle between the spines of the two towing apparatus 200. FIG. 15 shows a vertical-axis joint 703 between each towing apparatus 200 and the collector 710.

As shown particularly in FIG. 16 the debris collector 710 has an overall wedge shape in vertical cross-section, with the thin end facing forwardly. It has a recycled plastics body 705, on the trailing side of which there is a closed C-shaped surge overflow member 706 forming an arc-shaped enclosure on the ocean surface behind the body 705.

The guide has air pockets 712 for buoyancy and reduction of the volume of plastics required. The overall width (mouth width) of the collector 710 is in this example about 50 m, but it may in general have a mouth width in the range of about 20 m to 200 m. The height of the collector 710 at the aft end (maximum height) is preferably in the range of 3 m to 7 m, and the fore-aft dimension (right to left) is preferably in the range of 8 m to 15 m. The latter dimension includes a leading deflecting skirt 715 which is in use submerged, to deflect debris up onto a beach-like slope with ridges 713. The height of the ridges is preferably in the range of 30 mm to 120 mm, and more preferably in the range of 40 mm to 100 mm.

The main body 705 slope with ridges 713 leads up to a collecting channel 714 extending around the aft periphery of the body 705. The ridges 713 have the effect of assisting the debris to ride up the slope in a manner analogous to debris washing onto a beach. The ridges act like non-return valves and the debris is guided into the channel 714, from where it may be delivered into a suitable container. In this embodiment the guide forms what may be regarded as a sloping beach section with ridges, but sloping hair-like members may be used additionally or instead. Also, the ridges may be sharp enough to deter seals from forming a colony. Excess debris may surge over the body into the enclosure formed by the member 706.

The guide 710 acts as a raised gutter for debris storage. It is envisaged that the body may incorporate a chamber for a flocculating agent which is pumped into the gutter 714 to assist agglomeration of small plastics particles. In other embodiments the body includes a solar-driven rotor which grinds seaweed to provide a flocculating agent.

It will be appreciated that the apparatus very effectively guides debris to a collection location, using wave energy to cause movement and with simple steering and turning provided by the tugs 200 guided by the pilot vessels P (which may be un-manned). Oil and seaweed will be collected as well as polluting plastics debris. These can for example be drained and burned in a power station.

Referring to FIG. 17 an alternative debris collector, 1000, has a body with an overall configuration akin to that of the collector 710. In this case there are ridges 1002 for retaining washed-up debris, and buoyancy volumes 1003. In this example and in the collector 710 the maximum height of the collector is preferably in the range of 4 m to 7 m. The dimensions are in the same ranges as those of the collector 710, and the buoyancy is such that about a third of it is submerged relative to the maximum height at the aft end (left as viewed in FIGS. 16 and 17.

In this case the collector has a number of debris-collecting tubes 1010 extending downwardly for a depth of about 20 m, each tube having a diameter of about 3 m in this example, and generally preferably in the range of 1 m to 5 m. The debris tends to float and collect in the upper end of the tubes 1010, and there may be a flocculating agent used.

The spine may be lowered in calmer seas to help to elevate the collector for improved collection of debris to the collection gutter. This raising and lowering feature can be used to support other loads such as the load of collected, draining material while awaiting collection vessels. The apparatus may include a controller to pump fluid into buoyancy fluid containers such as pockets in the collector body to control elevation and attitude.

In another example, the collector body is of a flexible material and the apparatus includes a controller to pump air into pockets to control rigidity of the body.

It is envisaged that there may be a number of collection apparatus operating at any one time to sweep thousands of square km of the ocean surface. It is very advantageous that there are little or no fossil fuel emissions and little crewing requirements. The towing apparatus may be used for low-value bulk materials such as sand and gravel to the sites of major projects. Also, bulk ores being moved by the towing apparatus.

The invention is not limited to the embodiments described but may be varied in construction and detail. For example, the collection apparatus may have towing apparatus different from those described linked to the guide. In any of the examples described the restraint may be elastic, thereby acting like a spring with wind-up accumulator operation. Where there is a ratchet it may be driven by blade oscillation. Buoyancy of the apparatus may be achieved by the spine being hollow at least in parts.

The invention claimed is:

1. A wave-powered towing apparatus comprising:
a spine extending in a longitudinal direction and having a length of at least 100 m, and with a leading end and a trailing end;
a series of blades each mounted to the spine to rotate about an axis substantially transverse to the longitudinal direction, each blade having a first surface facing generally in a trailing end direction and a second surface facing generally in a leading end direction;
restraints preventing rotation of each blade by more than a pre-set amount towards the leading end, so that impingement of a wave on the first surface applies a force to the wave-powered towing apparatus in the leading end direction; and
an actuator arranged to retract the series of blades towards the spine or to remove constraints to render the series of blades disabled, and the constraints comprising restraint cables and the actuator comprising a linear actuator to adjust the restraint cables of the series of blades to allow the series of blades to pivot freely.

2. The wave-powered towing apparatus as claimed in claim 1, wherein the spine comprises at least one pair of parallel spine members and the series of blades are each coupled to the at least one pair of parallel spine members.

3. The wave-powered towing apparatus as claimed in claim 1, wherein at least some of the series of blades are mounted for rotation about substantially vertical axes, wherein a dimension of the series of blades in the horizontal direction is in a range of 1.0 m to 2.0 m, and a depth of the series of blades is in a range of 10 m to 25 m.

4. The wave-powered towing apparatus as claimed in claim 1, wherein the spine comprises buoyancy, and wherein the buoyancy comprises a series of floats or buoys.

5. The wave-powered towing apparatus as claimed in claim 1, wherein there are at least three parallel spine members, forming two pairs of spine members each supporting a series of blades; and wherein the series of blades of two series are overlapping in a transverse direction.

6. The wave-powered towing apparatus as claimed in claim 1, wherein at least some of the series of blades each comprise a plate and a lip along a free edge extending towards the trailing end.

7. The wave-powered towing apparatus as claimed in claim 1, wherein at least some of the series of blades are mounted for rotation about substantially horizontal axes and a length of the blades is in a range of 5 m to 25 m, and a depth of the blades is in a range of 1.0 m to 2.0 m.

8. The wave-powered towing apparatus as claimed in claim 1, wherein a gap between blades in each series is 1.0 m to 3.0 m, and wherein a length of the wave-powered towing apparatus is in a range of 100 m to 1 km.

9. The wave-powered towing apparatus as claimed in claim 1, wherein constraints of at least some blades comprise restraint cables, each extending from the spine to a blade at or near a blade free edge, whereby waves incident on the first surface apply force via the blade, to couplers of the blades and the restraint cables.

10. The wave-powered towing apparatus as claimed in claim 1, wherein constraints of at least some blades comprise a lock configured to engage a blade to prevent rotation.

11. The wave-powered towing apparatus as claimed in claim 1, wherein the spine comprises at least one member which includes a fluid pocket.

12. A collection apparatus for gathering floating debris from the sea surface, the collection apparatus comprising at least two wave-powered towing apparatuses linked to a gathering debris collector so that the at least two wave-powered towing apparatuses and the gathering debris collector form a C-shape in plan view, wherein the gathering debris collector is sloped upwardly from a leading end rearwardly, and comprises a debris-collection volume at a trailing end, wherein the gathering debris collector forms a leading mouth with a width in a range of 20 m to 200 m, and the gathering debris collector comprising protrusions on a slope for preventing fallback of debris, at least some of the protrusions being of increasing height in a trailing direction, and the protrusions including one or more ridges and strands of material anchored on a guide body.

13. The collection apparatus as claimed in claim 12, wherein the collection apparatus includes a controller adapted to pump fluid into buoyancy fluid containers, the buoyancy fluid containers include pockets in the gathering debris collector to control elevation.

14. The collection apparatus as claimed in claim 12, wherein the gathering debris collector is at least partly of a flexible material and the collection apparatus includes a controller to pump fluid into air pockets to control rigidity of the gathering debris collector.

15. The collection apparatus as claimed in claim 12, wherein the gathering debris collector comprises at least one downwardly-depending conduit, the at least one downwardly-depending conduit includes a tube for debris collection, and wherein the tube has a diameter in a range of 1 m to 5 m.

16. The collection apparatus as claimed in claim 12, wherein the gathering debris collector has a maximum height in a range of 3 m to 7 m, and a fore-aft dimension in a range of 8 m to 20 m, and a mouth width in a range of 20 m to 200 m.

17. The collection apparatus as claimed in claim 12, wherein the at least two wave-powered towing apparatuses comprise a spine extending in a longitudinal direction and having a length of at least 100 m, and with a leading end and a trailing end;
a series of blades each mounted to the spine to rotate about an axis substantially transverse to the longitudinal direction, each blade having a first surface facing generally in a trailing end direction and a second surface facing generally in a leading end direction; and
restraints preventing rotation of each blade by more than a pre-set amount towards the leading end, so that impingement of a wave on the first surface applies a force to the collection apparatus in the leading end direction.

* * * * *